United States Patent
Roth et al.

(10) Patent No.: US 6,255,939 B1
(45) Date of Patent: Jul. 3, 2001

(54) METHOD AND DEVICE FOR SENSING AN OBJECT OR A PERSON IN THE INTERIOR OF A VEHICLE

(75) Inventors: Christoph Roth, Tokyo (JP); Alexander Waldmann, Regensburg (DE); Reinhard Hamperl, Koefering (DE); Thomas Stierle, Regensburg (DE); Reinhard Roesl, Wenzenbach (DE); Gerhard Mader, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/513,620

(22) Filed: Feb. 25, 2000

(30) Foreign Application Priority Data

Feb. 25, 1999 (EP) .................................. 99103696

(51) Int. Cl.⁷ .................................................. B60Q 1/00
(52) U.S. Cl. ................. 340/425.5; 340/436; 340/438; 340/636; 340/661; 340/635
(58) Field of Search ................. 340/425.5, 436, 340/438, 636, 661, 635; 280/728.1; 382/100, 104, 103; 73/323, 320; 455/38.3

(56) References Cited

U.S. PATENT DOCUMENTS

| | | | |
|---|---|---|---|
| 4,660,027 | * 4/1987 | Davis | 340/691 |
| 5,482,314 | 1/1996 | Corrado et al. | 280/735 |
| 5,626,359 | * 5/1997 | Steffens, Jr. et al. | 280/735 |
| 5,782,485 | * 7/1998 | Takeda et al. | 280/735 |
| 5,845,000 | * 12/1998 | Bread et al. | 382/100 |
| 5,933,120 | * 8/1999 | Manasson et al. | 343/788 |
| 5,943,295 | * 8/1999 | Varga et al. | 367/99 |

FOREIGN PATENT DOCUMENTS

19757137A1  2/1999  (DE).

OTHER PUBLICATIONS

Japanese Patent Abstract No. 09240417 (Makoto), dated Sep. 16, 1997.

Japanese Patent Abstract No. 09020206 (Yuikinori), dated Jan. 21, 1997.

* cited by examiner

Primary Examiner—Jeffery Hofsass
Assistant Examiner—Hung Nguyen
(74) Attorney, Agent, or Firm—Herbert L. Lerner; Laurence A. Greenberg; Werner H. Stemer

(57) ABSTRACT

A sensor for detecting an object or a person in the interior of a vehicle consumes a first average power in a normal operating mode. The power supply for supplying the sensor is monitored. The sensor is operated with a second average power which is reduced in comparison with the first average power if the power supply is considered as no longer being sufficient for the normal operating mode.

18 Claims, 2 Drawing Sheets

METHOD AND DEVICE FOR SENSING AN OBJECT OR A PERSON IN THE INTERIOR OF A VEHICLE

BACKGROUND OF THE INVENTION

FIELD OF THE INVENTION

The invention lies in the automotive technology field. More specifically, the invention relates to a device and a method for sensing an object or a person in the interior of a vehicle.

Persons who are displaced far forward in the direction of the dashboard such as, for example, children and infants in so-called rearward facing child seats on the front-seat passenger seat are subjected to the hazard, during the operation of a motor vehicle provided with an airbag, of suffering injuries as result of the inflation impact of the airbag in the event of an accident. Modern control systems for person protection aim at switching off the airbag in such situations or inflating it with reduced momentum in order to avoid the risk of injury to a vehicle occupant. In order to determine the position of the vehicle occupant in the vehicle, use is preferably made of contactless, optical sensors.

A device for the contactless detection of an object or of a person in the interior of a vehicle is known from European patent application EP 0 669 227 A1. There, the vehicle seat is irradiated by a number of LEDs. Beams which are reflected from the seat or a person or an object on the vehicle seat are registered by a photodetector field.

Such a device for detecting objects and persons is usually arranged in the interior of the vehicle as a device which is embodied separately from the actual control device for the occupant protection means, in such a way that it is made possible either for a vehicle occupant to be detected on the vehicle seat or else for a hazard zone to be sensed in front of the folded-up airbag. In the latter case, the interior of the vehicle, or at least part of it, is preferably examined for the presence of an object or of a person. If a child's seat or part of a body of a vehicle occupant is detected in this hazard zone, the airbag is not triggered, or is only triggered in a metered fashion.

The device is operated with a power supply. In the event of an impact in which in particular the position of a vehicle occupant must be detected in order to be able to influence the unfolding of the airbag if necessary, it is then possible to interrupt the power supply to the device by way of a mechanical effect, or to adversely affect the power supply in the form of a power leakage discharge, in such a way that the supply voltage which is necessary to operate the electrical device can no longer be permanently ensured. Thus, in the event of an impact, there is the risk of the device being operationally incapable exactly during the decisive milliseconds during the impact. Even if the power supply is still intact with a reduced supply voltage, the device is no longer capable of registering the necessary data and outputting it to a control device for the occupant protection means because the device usually contains loads with a high power requirement, such as laser diodes, for example.

SUMMARY OF THE INVENTION

It is accordingly an object of the invention to provide a method and device for detecting an object or a person in the interior of a vehicle, which overcome the above-mentioned disadvantages of the heretofore-known devices and methods of this general type and which, even if the power supply of a known system is adversely affected, make available sufficient data for the control device for the occupant protection means.

With the foregoing and other objects in view there is provided, in accordance with the invention, a device for determining a presence of an object in the interior of a vehicle, comprising:

a sensor for detecting an object in an interior of a vehicle;

a power supply;

a control unit connected to the sensor, the control unit being programmed to selectively operate the sensor:
  in a normal operating mode, when a sufficient power supply is detected by the control unit, during which the sensor consumes a first average power; and
  in an emergency operating mode, when an insufficient power supply is detected by the control unit, during which the sensor consumes a second average power less than the first average power.

In accordance with an added feature of the invention, the control unit monitors the supply voltage of the power supply.

In accordance with an additional feature of the invention, the control unit activates the emergency operating mode as soon as the supply voltage drops below a given threshold value.

In accordance with another feature of the invention, the control unit activates the normal operating mode when the supply voltage exceeds a given threshold value.

In accordance with a further feature of the invention, the sensor is designed to scan the object with a predefined scanning rate. In a preferred embodiment, the normal scanning rate is reduced during the emergency operating mode.

In accordance with again an added feature of the invention, the sensor contains a plurality of sensor elements each monitoring an associated area.

In accordance with again a further feature of the invention, only one sensor element or a reduced number of elements is operated during the emergency operating mode.

In accordance with again another feature of the invention, the sensor includes a transmitter for emitting a signal. The transmitter is operated with a given transmission power in the normal operating mode and with a reduced transmission power, in comparison with the given transmission power, in the emergency operating mode.

In accordance with a preferred embodiment, the sensor includes an optical transmitter device and an optical receiver device.

With the above and other objects in view there is also provided, in accordance with the invention, a method for sensing an object in an interior of a vehicle, which comprises:

sensing an object in an interior of a vehicle in a normal operating mode of a sensor and thereby consuming a first average power with the sensor;

monitoring a power supply of the sensor; and operating the sensor with a second average power less than the first average power if the power supply is detected to be insufficient for the normal operation.

In this respect, a control unit of the device brings about a situation which the sensor for sensing an object or a vehicle occupant is operated with just a low average power if the power supply is classified as no longer being sufficient for normal operation. In such a context, the sensor is operated in this so-called emergency operating mode with an average power which is reduced in comparison with the average power provided for the normal operating mode.

The advantage of the invention lies in the fact that the remaining power reserves are utilized economically, in which case, if appropriate, a proportion of the maximum achievable sensor information is dispensed with in favor of generating sensor data which can still at least give a rudimentary picture of the position of the vehicle occupant to the control device for the occupant protection means, on the basis of a reduced amount of available power, but for a time period of approximately 150 milliseconds.

The device, however, is preferably not necessarily designed as a separate electrical, housed apparatus. The power supply can be configured here as a supply voltage which is fed to the apparatus from the outside, in particular as a vehicle battery voltage. However, a supply voltage which is fed from the outside and is converted in the apparatus may also be defined as a power supply. Furthermore, an autonomous supply for the electrical device in the form of a battery may also be provided as the power supply. The power supply can also comprise a power storage capacitor in the electrical apparatus, which capacitor is continuously supplied with a supply voltage fed in from the outside, and assumes the function of supplying power to the device when the standard power supply from the vehicle battery is interrupted. The resource-saving mode of operation of the device according to the invention is advantageous in just such cases.

The device for sensing an object or a person can be directed as the hazard area in front of a folded-up airbag module in the inflation direction and can thus communicate the presence of an object or of a person in this area. However, sensing devices for objects or persons which are directed at the vehicle seat and can detect when a person moves out of his normal seated position can also be applied. It is also possible to apply sensing devices which can scan the entire front part of the interior of the vehicle and detect any type of position of an object or person. The invention is therefore not restricted to specifically sensing an image of an object or of a person, but rather in particular also for monitoring specific areas in the interior of a vehicle for the presence of an object or of a person. The invention is designed for contactless sensing in this respect.

A sensor of such a sensing device can be based on different physical effective principles:

Thus, the sensor can preferably sense its effective range by means of optical radiation, in particular infrared radiation. However, radiation with other wavelengths is also conceivable. The sensor contains in this case an LED, in particular an infrared transmitter in the form of a laser diode which outputs one or more beams or radiation curtains. The sensor then also contains one or more optical receiver elements in the form of photo cells which pick up the radiation which has been reflected or defracted at an object or a person. By evaluating the reflected radiation, the distance between the sensor and the object and, if appropriate, contouring and precise determination of the position are determined in the two-dimensional or three-dimensional space. Preferably, the sensor projects a plurality of beam curtains which are arranged one behind the other in the direction of travel in the vertical plane and contains, with respect to the transverse axis of the vehicle, a plurality of receiver elements per beam curtain. Three-dimensional detection of persons or objects is thus ensured because each receiver element supplies a two-dimensional item of information, and the third vertical dimension is acquired by means of an evaluation of the strength, the power or the energy content of reflected radiation. A sensing device with simple technical means, has, for example, just one photo-electrical barrier which scans the unfolding space of the airbag.

The sensor of the sensing device can also be embodied as a camera and supply images which are then subject to pattern recognition procedures.

However, the sensor can also be embodied as a heat sensor in the form of an infrared pickup which can determine the presence and the position of a living person by means of the thermal radiation which a person emits.

In addition, ultrasonic sensors or microwave sensors can also be used.

A position of an object or person where there is active radiation of the object or of the person is preferably determined using the methods of propagation time measurement or of triangulation.

The normal operating mode for the sensor is characterized by the fact that the power supply can deliver sufficient energy for the basic design operation of the device, and in particular of the sensor. In this context, depending on its configuration, the sensor is preferably operated with a predefined scanning rate, with a predefined transmission power and/or with a plurality of scanning zones which are sufficient for precise determination of the position of the vehicle occupant during an impact. In summary, the sensor is operated here with a specific average power. The average power results here from a power drain which is averaged over time over all the power-consuming sensor elements of the sensor—if a plurality of sensor elements are present. Because the sensor is operated in a pulsed mode, a chronological consideration which includes a plurality of pulses is advantageous for the determination of the average power.

The emergency operating mode is characterized by the fact that the power supply is no longer sufficient for the normal operating mode described above. For this purpose, the control unit monitors an electrical parameter of the power supply, in particular its supply voltage. If this electrical parameter drops below a predefined limiting value, the control unit (preferably implemented as a microprocessor) ensures that the normal operating mode is terminated and the emergency operating mode is activated. The operating modes are therefore switched over. Both operating modes are preferably embodied in the form of program sections in a software code. In the emergency operating mode, the sensor is operated with an average power which is lower than the average operating power in the normal operating mode.

In such a case, the transmission power from one or more transmitters of the sensor, in particular the transmission power of the laser diodes, is preferably reduced. However, the reduced power is to be dimensioned here in such a way that the sensor supplies a signal which can still be measured. The power which is sufficient for this is usually specified by the manufacturers of the transmitters. In the normal operating mode, the transmission unit is operated with a power which is greater than this minimum transmission power in order to obtain a sufficiently sensitive signal in all cases.

In a further advantageous development of the invention, the sensor contains a plurality of sensor elements, each sensor element being designed to monitor an associated zone. The greater the number of such sensor elements provided, the higher the resolution of the position of the object. In the emergency operating mode, just one sensor element is then preferably operated with one transmitter or a low number of sensor elements which is smaller their overall number. As a result of the switching off of individual sensor elements in the emergency operating mode, the resolution is reduced in favor of an updated detection of the position of the vehicle occupant. When the hazard area in front of an airbag is scanned, preferably only the zone closest to the folded airbag is scanned now. Overall, the average operating power of the sensor is thus reduced.

In a further advantageous development of the invention, the scanning rate which is provided in the normal operating mode is reduced. Here, in the emergency operating mode the scanning rate can be determined as a function of the power reserve which is still available. In an extreme case possibly just one image is registered. When there are a plurality of power-consuming sensor elements, the scanning rate of all the sensor elements can be reduced. However, the scanning rate of individual sensor elements can also be reduced, in particular of those sensor elements which do not cover the safety-critical area directly in front of the airbag. With the reduction of the scanning rate, the average power for the generation of an image of an object or of a person is also reduced.

Further details of the invention comprise mixed forms of power reduction. Thus, individual sensor elements, for example ones which scan peripheral areas, of the sensor can be switched off. Those sensor elements which supply higher-priority information are operated with just a reduced scanning rate.

The power supply in the emergency operating mode can take the following forms: in the case of a below-average supply voltage, the power supply operated by means of the vehicle battery is switched off. The further power supply is ensured by means of an emergency current unit such as for charging a power storage capacitor. Alternatively, when the supply voltage drops below a predefined value, the electric device continues to be operated from the vehicle's electrical system.

In summary, the invention has the advantage, even when the power supply is adversely affected, especially in the case of an impact, sufficient information for controlling the vehicle-occupant protection means is supplied, said information relating to an object in the interior, the position of a child's seat or of a vehicle occupant, and in particular the presence of an object or vehicle occupant in the hazard area of an airbag.

Other features which are considered as characteristic for the invention are set forth in the appended claims.

Although the invention is illustrated and described herein as embodied in a method and device for sensing an object or a person in the interior of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
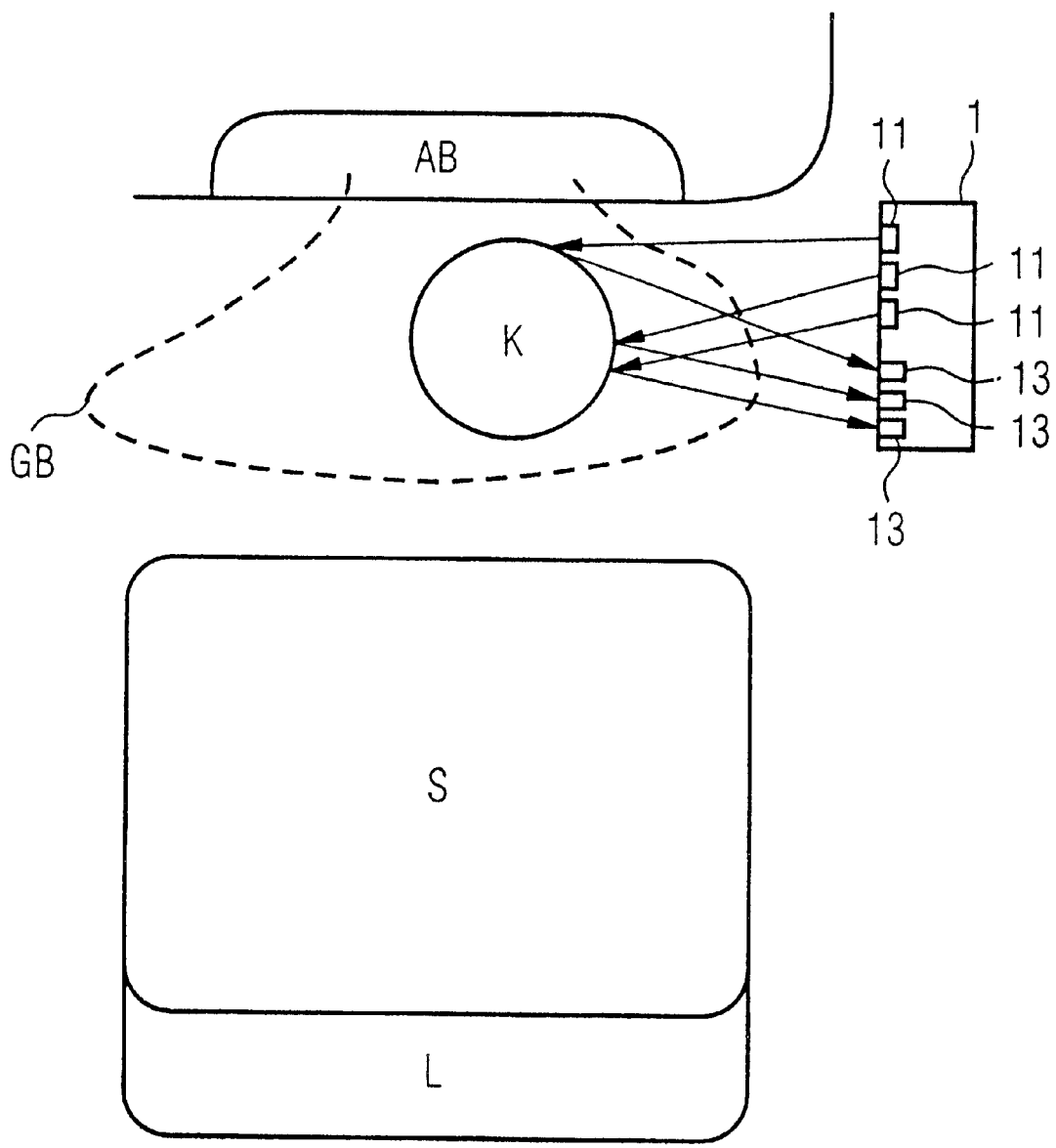
FIG. 1 is a diagrammatic plan view of the interior of a motor vehicle.

Referring now to the figures of the drawing in detail and first, particularly, to FIG. 1 thereof, there is seen, in symbolic form, a plan view of the front seat passenger's side of the interior of a motor vehicle. The reference symbol AB identifies an airbag module which is disposed behind a cover of the dashboard and which contains a gas generator and a folded-up airbag. This occupant protection means is connected electrically to a non-illustrated control device, which controls the airbag essentially as a function of an impact and the position of the vehicle occupant. At a distance from the airbag module a seat is shown schematically with a seating surface S and the backrest L in a plan view. In an area directly in front of the folded-up airbag AB, the head K of a vehicle occupant is shown schematically. The hazard area GB is shown here by broken lines. The hazard area or danger zone GB represents the airbag in its inflated state. A sensor 1 for sensing an object is arranged on the right. The sensor 1 contains three optical transmitters 11 and three optical receivers 13. In each case one transmitter 11 and one receiver 13 form a sensor unit. Here, infrared light, which is reflected at an object K that may be present in the hazard area GB of the airbag AB and is consumed by the associated receiver 13 is output by the transmitters 11. The distance between the sensor 1 and the object K is determined by means of a propagation time measurement or a triangulation method.

An at least two-dimensional image of the area in front of the airbag AB is ensured by virtue of the plurality of sensor elements provided.

Figure 2:
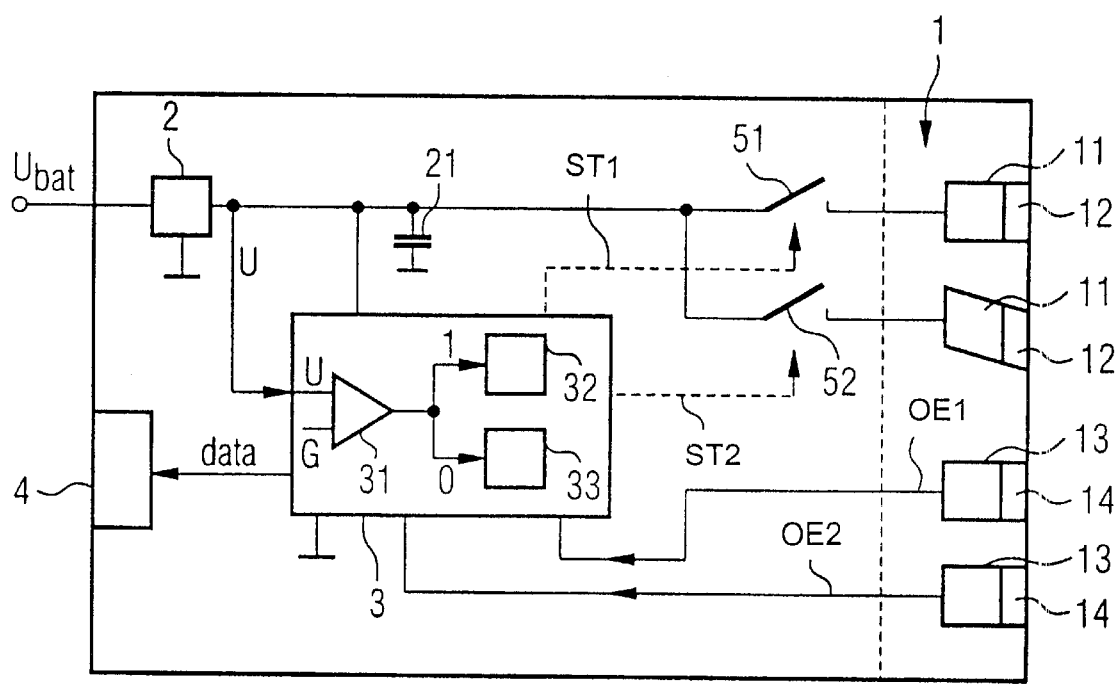
FIG. 2 is a schematic block circuit diagram of a device according to the invention.

Referring now to FIG. 2, there is shown a block circuit diagram of a device according to the invention for sensing an object or a person in the interior of a vehicle. The electrical apparatus contains a sensor 1 for detecting an object with two transmitters 11 each with a transmission lens 12 and two receivers 13 each with a receiver lens 14. In addition, the apparatus contains a power supply 2 and a control unit 3 as well as an interface 4. The power supply 2 is embodied here as a voltage transformer. The voltage transformer 2 transforms a supplied vehicle battery voltage $U_{bat}$ into a voltage U which is suitable for operating the device and with which, in particular, the control unit 3 which is embodied as a microprocessor is also supplied. In addition, the power supply 2 feeds a power storage capacitor 21. The supply voltage U is connected to electrically controllable switches 51 and 52 which can, in particular, also be embodied as switchable power transistors. The controllable switches 51 and 52 are in turn connected to the optical transmitters 11. The controllable switches 51 and 52 are controlled by control signals ST1 and ST2 which are supplied by the control unit 3. In the closed state of the controllable switches 51 and 52, the optical transmitters 11 emit light. By briefly closing one of the controllable switches 51 and 52, a light pulse is therefore emitted by the assigned optical transmitter 11. The optical receivers 13 in turn supply received optical signals as electrical variables OE1 and OE2 to the control unit 3. The optical receivers 13 detect an object in the sensing area of the optical transmitters, which is determined essentially by the transmission power and the radiation angle.

The control unit 3 controls the controllable switches 51 and 52 and processes the received signals OE1 and OE2. The control unit 2 contains, for this purpose, essentially two programs or program sections which are characterized symbolically by the reference symbol 32 for a normal operating mode and by the reference symbol 33 for an emergency operating mode. This control software for the normal operating mode is designed here in such a way that the controllable switch 51 is cyclically switched on, as a result of which a light pulse is output by the transmitter 11. A reflected light beam is optically registered by the first receiver 13 and converted into an electrical signal. The associated signal OE1 is initially stored in a non-illustrated memory of the control unit 3. The further controllable switch 52 is then closed and shortly afterwards opened again, with the result that the second transmitter 11 outputs a light pulse. The further receiver 13 then supplies a signal OE2 to the control unit which is in turn buffered there. A plurality of sensor elements which each comprise a transmitter and a receiver may be provided. The number depends on the desired resolution of the image obtained. The further sensor elements are actuated in accordance with the principle described above.

After all the sensor elements are actuated with staggered timing, the control unit 3 generates a virtual image on the basis of the data OE1 and OE2. Another evaluation of the data OE1 and OE2 can also be made. The control unit 3 supplies such evaluation results in the form of signals data, preferably in coded form, to the interface 4. The interface 4 is preferably connected to a control device for the occupant protection means via a data line. The control device for the vehicle-occupant protection means evaluates the transmitted data according to its requirements and controls the connected occupant protection means such as airbags, seat belt pretensioning devices, roll-over protection device etc. as a function of these data.

The control unit 3 contains a comparator 31 which is implemented by means of software and which compares the supply voltage U or the vehicle's electrical system voltage $U_{bat}$ with a limiting value G. If the supply voltage U exceeds the limiting value G, the electrical apparatus is operated in the normal operating mode 32 (signal 1). If the supply voltage U drops below the limiting value G, the electrical apparatus is operated in the emergency operating mode 33 (signal 0 of the comparator). In order to avoid high-frequency switch-over between the normal operating mode and the emergency operating mode, the control unit may be designed in such a way that when an operating mode is detected it is applied for a predefined time in all cases. To do this, the comparator can also have switching characteristics with hysteresis.

The term "object" as used in the following claims should be understood to include animate and inanimate objects, i.e., persons and things.

We claim:

1. A device for determining a presence of an object in the interior of a vehicle, comprising:
   a sensor for detecting an object in an interior of a vehicle;
   a power supply;
   a control unit connected to said sensor, said control unit being programmed to selectively operate said sensor:
   in a normal operating mode, when a sufficient power supply is detected by said control unit, during which said sensor consumes a first average power; and
   in an emergency operating mode, when an insufficient power supply is detected by said control unit, during which said sensor consumes a second average power less than the first average power, said sensor being adapted to scan the object with a predefined scanning rate, the scanning rate being lower during the emergency operating mode than the scanning rate during the normal operating mode.

2. The device according to claim 1, wherein said control unit is adapted to monitor a supply voltage of said power supply.

3. The device according to claim 2, wherein said control unit activates the emergency operating mode as soon as the supply voltage drops below a given threshold value.

4. The device according to claim 2, wherein said control unit activates the normal operating mode when the supply voltage exceeds a given threshold value.

5. The device according to claim 1, wherein said sensor contains a plurality of sensor elements each monitoring an associated area.

6. The device according to claim 5, wherein only one sensor element is operated during the emergency operating mode.

7. The device according to claim 5, wherein fewer sensor elements are operated during the emergency operating mode than a total number of sensor elements.

8. The device according to claim 1, wherein said sensor includes a transmitter for emitting a signal, wherein said transmitter is operated with a given transmission power in the normal operating mode and with a reduced transmission power, in comparison with the given transmission power, in the emergency operating mode.

9. The device according to claim 1, wherein said sensor includes an optical transmitter device and an optical receiver device.

10. A device for determining a presence of an object in the interior of a vehicle, comprising:
    a sensor for detecting an object in an interior of a vehicle;
    a power supply;
    a control unit connected to said sensor, said control unit being programmed to selectively operate said sensor:
    in a normal operating mode, when a sufficient power supply is detected by said control unit, during which said sensor consumes a first average power; and
    in an emergency operating mode, when an insufficient power supply is detected by said control unit, during which said sensor consumes a second average power less than the first average power, said sensor being adapted to scan the object with a predefined scanning rate, the scanning rate being reduced during the emergency operating mode in comparison with the predefined scanning rate.

11. The device according to claim 10, wherein said control unit is adapted to monitor a supply voltage of said power supply.

12. The device according to claim 11, wherein said control unit activates the emergency operating mode as soon as the supply voltage drops below a given threshold value.

13. The device according to claim 11, wherein said control unit activates the normal operating mode when the supply voltage exceeds a given threshold value.

14. The device according to claim 10, wherein said sensor contains a plurality of sensor elements each monitoring an associated area.

15. The device according to claim 14, wherein only one sensor element is operated during the emergency operating mode.

16. The device according to claim 14, wherein fewer sensor elements are operated during the emergency operating mode than a total number of sensor elements.

17. The device according to claim 10, wherein said sensor includes a transmitter for emitting a signal, wherein said transmitter is operated with a given transmission power in the normal operating mode and with a reduced transmission power, in comparison with the given transmission power, in the emergency operating mode.

18. The device according to claim 10, wherein said sensor includes an optical transmitter device and an optical receiver device.

* * * * *